US 8,250,196 B2

(12) United States Patent
Demir et al.

(10) Patent No.: US 8,250,196 B2
(45) Date of Patent: Aug. 21, 2012

(54) SCRIPT BASED COMPUTER HEALTH MANAGEMENT SYSTEM

(75) Inventors: Mehmet Demir, Redmond, WA (US); Adrian A. Maziak, Sammamish, WA (US); Alp U. Onalan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 12/258,551

(22) Filed: Oct. 27, 2008

(65) Prior Publication Data
US 2010/0106819 A1 Apr. 29, 2010

(51) Int. Cl.
*G06F 15/173* (2006.01)

(52) U.S. Cl. ........... 709/223; 709/203; 703/22; 719/310

(58) Field of Classification Search ......... 719/310; 709/203, 217, 219, 224, 223; 703/22; 726/11, 726/22; 714/15
See application file for complete search history.

(56) References Cited

U.S. PATENT DOCUMENTS

| 7,197,561 | B1 * | 3/2007 | Lovy et al. | 709/224 |
|---|---|---|---|---|
| 7,237,243 | B2 * | 6/2007 | Sutton et al. | 719/310 |
| 7,600,160 | B1 * | 10/2009 | Lovy et al. | 714/57 |
| 2003/0037177 | A1 * | 2/2003 | Sutton et al. | 709/316 |
| 2004/0133847 | A1 * | 7/2004 | Iino et al. | 715/500 |
| 2006/0064486 | A1 * | 3/2006 | Baron et al. | 709/224 |
| 2006/0161664 | A1 * | 7/2006 | Motoyama | 709/228 |
| 2006/0224623 | A1 * | 10/2006 | Graziadio et al. | 707/104.1 |
| 2006/0233312 | A1 * | 10/2006 | Adams et al. | 379/21 |
| 2008/0228911 | A1 * | 9/2008 | Mackey | 709/224 |
| 2010/0262650 | A1 * | 10/2010 | Chauhan et al. | 709/203 |

* cited by examiner

Primary Examiner — Frantz Jean

(57) ABSTRACT

A management system may use a human readable script in which is defined executable statements that may gathers status information from various services. The status information may be displayed within a management user interface, which may also include various summary statistics including an overall security state. The services may be locally running services, and services provided or accessible over a local area network or wide area network. In some cases, the human readable script may include statements for starting or resuming the services, querying a running service, or querying a database related to a service. The user interface may be refreshed when the human readable script is updated and re-executed. The services may include security related services, among others.

20 Claims, 3 Drawing Sheets

SCRIPT BASED COMPUTER HEALTH MANAGEMENT SYSTEM

BACKGROUND

Managing computer and network health may involve many different components, each of which may contribute to the overall health of a computer or group of computers. An administrator may monitor many different services to determine the status or health of a system. For example, the security of a device may include a firewall service, an anti-malware service, a content monitoring service, and other services. In many cases, the various services may be provided by different manufacturers and may be configured to operate independently of other services.

In a network environment, an administrator may manage multiple devices and may also manage services that are provided from servers within a local area network or may be provided across a wide area network, such as web based services. In order to manage the various devices, the status of many different services may be collected.

SUMMARY

A management system may use a human readable script that contains executable statements that may gather status information from various services. The status information may be displayed within a management user interface, which may also include various summary statistics including an overall summary statistic. The services may be locally running services, and services provided or accessible over a local area network or wide area network. In some cases, the human readable script may include statements for starting or resuming the services, querying a running service, or querying a database related to a service. The user interface may be refreshed when the human readable script is updated and re-executed. The services may include security related services, among others.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
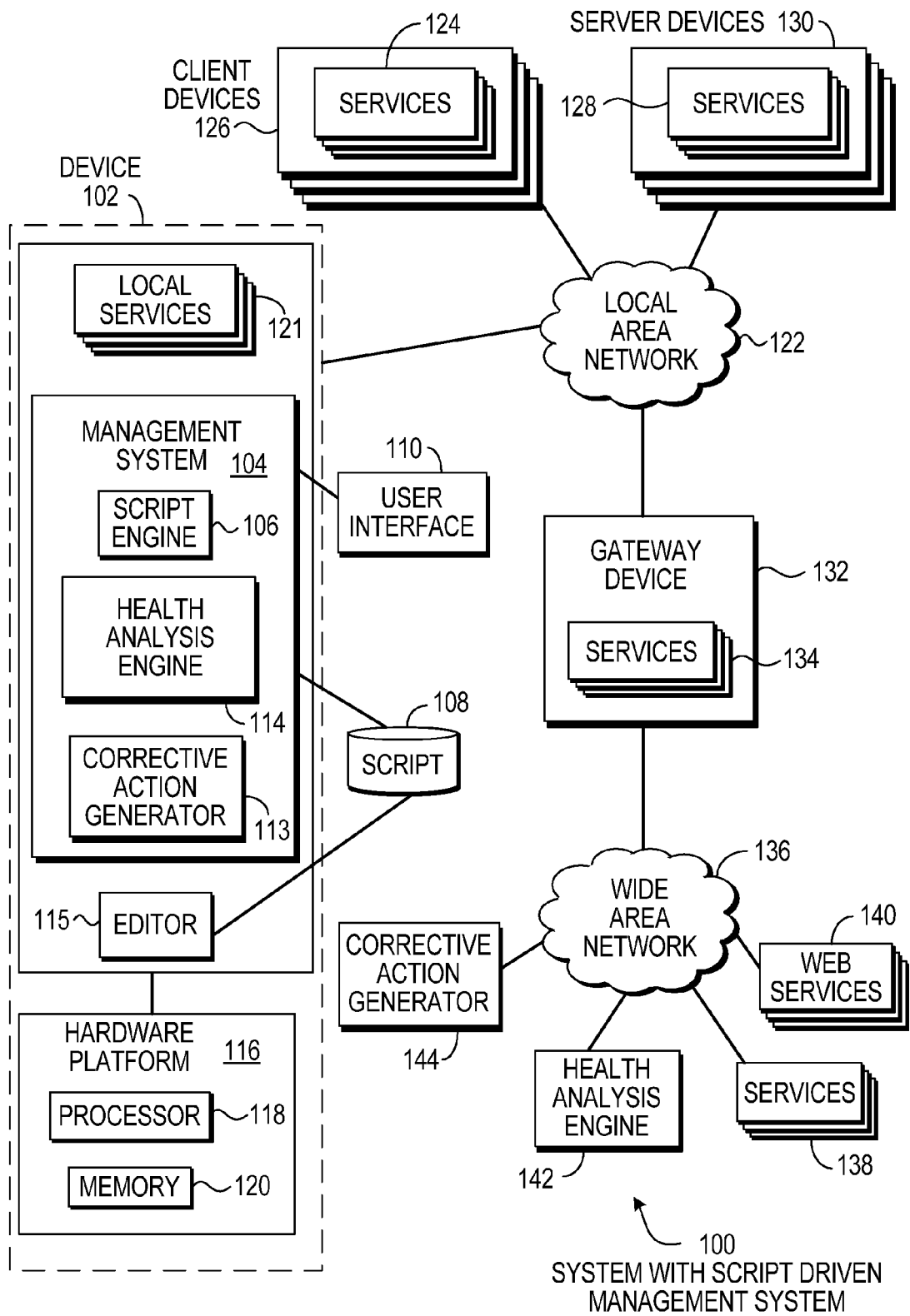
FIG. 1 is a diagram illustration of an embodiment showing a system with a script driven management system.

A management system may have a console that displays the status of a plurality of services. The status of the services may be defined in a human readable script that may contain executable statements that may perform various functions, including querying the service. In many cases, the management system may combine the status of the various services to determine an overall status for the monitored devices. The monitored devices may be a single device or one or more devices connected by a network.

The human readable script may be modified to include or remove various services. For example, the script may be modified to add a query to a newly added service and incorporate the service's status into the overall status of the system.

The script may enable services from different service providers, and services that provide different functions to be represented in the management system. The executable statements within the script may act as data sources within the management system, and may provide data that are displayed in the management system as well as data that are used to generate summary statistics for the services monitored by the management system.

The management system may have one or more user interfaces through which the status or health of various services may be displayed. The management system may gather status information from locally executing services, as well as services available over local or wide area networks. In some cases, a management system may gather status information from other client devices, servers, and web based services.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a script driven management system. Embodiment 100 is a simplified example of a management system that may be used to manage various services on a local device or services provided by other servers or services operable on client devices. The management system may have a script engine that may execute human readable scripts that may be edited, extended, or otherwise changed by a user.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a management system and an environment in which such a management system may be operated. The management system 104 may operate on a device 102 to gather status of various services. The status of the services may be used for monitoring the services, aggregating the services into a health status for the device 102 or other devices, as well as modifying the services and other management functions.

In a typical scenario, the management system 104 may monitor and manage security services for a single device or group of devices. In the scenario, the management system may monitor the status of firewall services, virus scanning services, message content services, authentication services, and other related security services. Each of the services may be separate, independent applications, functions, or other type of service, and each service may be provided by a different manufacturer and may have different mechanisms by which the service may be monitored and controlled. The management server may gather the status of each service, aggregate the status using a heuristic or formula to determine summary statistics, and present the status to a user. The management server may also include links or other mechanisms through which the user may change or configure individual services.

In the scenario above, the management system 104 may operate as a portal or central location from which many different services may be monitored and controlled. Because the management system 104 can gather information from different and disparate sources, the management system 104 may determine summary statistics, such as computer health indicators, that span multiple services.

The management system 104 may use a script engine 106 to execute a human readable script 108 that defines how each service may be accessed and how the data supplied by those services may be aggregated together to define one or more summary statistics.

The script 108 may define various calls to a service that may elicit data from the service. The data may include any type of data, such as a current operational status, number and severity of errors, configuration information, or other data. In some cases, data may be retrieved through a query to the service itself. Many services may have command line interface queries through which some functions of the service are exposed. In some cases, the script 108 may include calls that use such queries.

In some embodiments, the script 108 may call a function or service that queries the target service, pulls data from a configuration file or other database, or indirectly communicates with the target service. In such a case, the script 108 may not call the service directly. Some such cases may involve the script 108 calling a second application or service that interfaces with the target service or other artifacts of the target service. The term "target service" is used to indicate a service that ultimately performs a function that may be monitored by the management system.

The human readable script 108 may be written in a scripting language that is editable by a user. The user may be a system administrator or other technology professional that may have scripting skills but may not have extensive programming skills.

When a new service is added or an old service removed, the management system 104 may be updated by modifying the script 108. In many cases, a manufacturer of a service may provide a short script snippet that may be inserted into the script 108. By adding the snippet, the newly added service may be made available through the management system 104 for monitoring and, in some cases, control.

The script 108 may be a programming language that may be used to control an application. A 'script' may be different from a 'program' or 'application' in that a program may execute independently from any other application or program. The script 108 may be executed within the management system 104. The script 108 may be interpreted from a human-readable form, or may be semi-compiled to bytecode which is interpreted. In contrast, an application is traditionally compiled into native machine code for the system on which an application is run. In many embodiments, a command line interface may be available to execute the script 108.

The script engine 104 may be a shell that may execute the script 108. The shell may be hosted inside the management system 104. In such an embodiment, a scripting language that may be familiar to users and used in a command line interface may also be used to define actions within a management system 104.

In many embodiments, the script 108 may include commands that interface with various services. The script 108 may contain individual statements or groups of statements that may call application programming interfaces, command line functions, or other functions that are exposed by the service. Depending on the scripting language, such commands may be complex statements that may operate as data sources within the management system. The data sources may be used to supply any type of data from a service, and allow the management system 104 to display and manipulate the data.

The management system 104 may execute the script 108 to obtain data from many different services. The data may be processed by a health analysis engine 114 to determine an overall health or status based on data from many services. The health analysis engine 114 may use a formula, heuristic, or other algorithm that is defined in the script 108. In some cases, a separate script may be used to define the function of the health analysis engine 114.

The health analysis engine 114 may determine summary statistics from the data retrieved when the script 108 is executed by the script engine 106. The health analysis engine 114 may aggregate the retrieved data to generate an overall 'health factor' for the group of services. In an example, a script may include queries to several security related services. The services may each perform separate and unrelated functions, but the health analysis engine 114 may determine one or a group of parameters that summarize the overall health or status of the security services.

In a simple embodiment, the health analysis engine 114 may determine the overall status to be the worst status of each of the monitored services. For example, a security related script may query a firewall service, a content monitoring service, and a virus detection service. If two of the services are operating properly and one of the services is not operating or has a problem, the status of the problem service may be reflected as the overall health of the security services. In such an embodiment, a high level summary status may reflect the worst state of any of the monitored devices, or may be considered and aggregation of the health state of the monitored devices.

In a more complex embodiment, the health analysis engine 114 may combine data using complex heuristics or other algorithms to determine a health status. A client device within a local area network may have a firewall service and a virus detection service that is properly operating, but may not have a content filtering service operational. Using the previous example, the security health status for the client device may be classified as a security breach. However, the script 108 may also determine that a gateway device may have a content monitoring system operational. The health analysis engine 114 may determine that the content monitoring service running on the gateway device may provide a large degree of protection, so the client device's health may be classified as marginally bad but not a serious security breach. Such a determination may use heuristic or other complex relationships defined between services.

Figure 3:
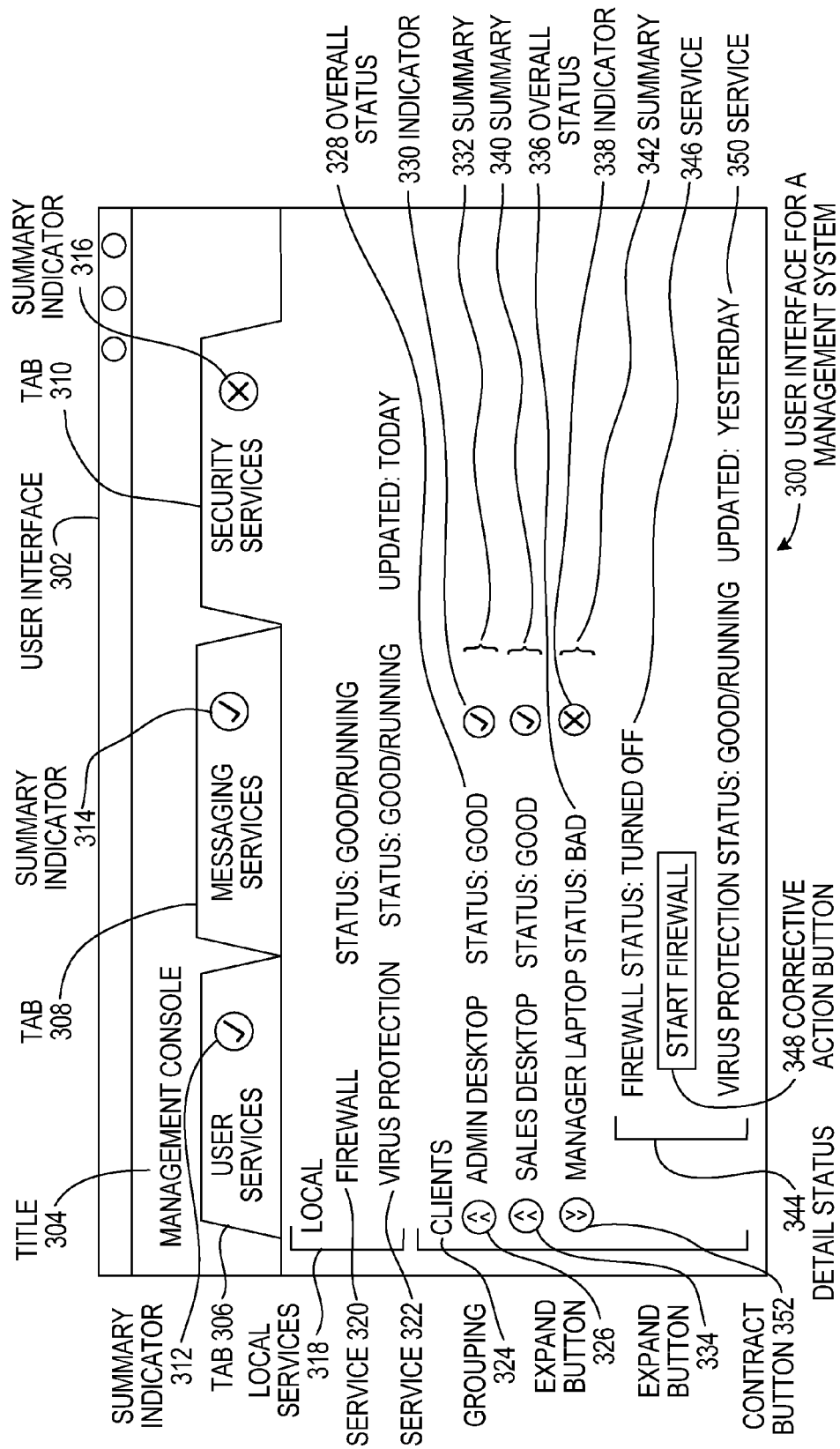
FIG. 3 is a diagram illustration of an embodiment showing a user interface for a management system.

The management system 104 may present the status of various monitored services on a user interface 110. The user interface 110 may include the status of services along with various summary statistics. An example of a graphical user interface is illustrated in FIG. 3 of this specification.

The user interface 110 may include links to corrective actions. A link to a corrective action may perform some manipulation of the monitored service, such as starting or stopping the service, configuring the service, or some other action. In many cases, the link to a corrective action may be defined using the same scripting language as script 108, and may be included in the script 108 in some embodiments.

The user interface 110 may be presented on a console device or other hardware device connected to the local device 102. In some embodiments, the user interface 110 may be a hypertext transport protocol document (HTTP) that may be displayed using a browser on another device. In such an embodiment, the user interface 110 may be transmitted to another device and displayed on the other device. Other embodiments may have different mechanisms for accessing and displaying the user interface 110 on the device 102 or some other device connected to a local area network 122 or a wide area network 136.

In some embodiments, a corrective action generator 113 may create the link to a corrective action. The corrective action generator 113 may select an appropriate corrective action from a group of predefined actions, may create a script that is customized to a current condition, or may otherwise define one or more corrective actions that may be performed on a particular service. In many cases, the corrective action generator 113 may provide specific corrective actions based on the conditions of one or more services.

An editor 115 may be used to update, change, or otherwise manipulate the script 108. In many embodiments, the editor 115 may be a simple text editor, but some embodiments may include an editor specifically designed to create and edit the script 108. In some cases, the editor 115 may include features such as syntax checking, tab completion, libraries of command sequences, help pages, and other features that may assist a user in creating and using scripts.

The device 102 may operate on hardware platform 116 that may include a processor 118, memory 120, and other hardware components. In some embodiments, the device 102 may be a server computer, while in other embodiments, the device 102 may be a personal computer, a personal digital assistant, network appliance, handheld device, or any other platform on which a management system 104 may operate.

In many cases, the management system 104 may be a system that may include software, firmware, and hardware that may perform the functions of a management system 104.

The management system 104 may monitor local services 121. Local services 121 are those services that operate on the device 102. In a typical personal computer embodiment, dozens of services may be operating. Services may include functions that are provided by and exposed by an operating system, applications such as middleware that perform functions used by many different applications, applications that operate independently, and any other function that may be monitored. In some embodiments, one application or middleware may expose two or more different services that may be separately managed by a management system 104.

The management system 104 may be connected to a local area network 122 and may monitor and control services 124 operating on client devices 126. In a typical use scenario, the management system 104 may operate on a server device that provides services to client devices 126, such as desktop or laptop computers, personal digital assistants, mobile telephony devices, or other user-centric devices.

In some embodiments, the management system 104 may communicate with and manage services 128 that are provided by server devices 130. In such a case, the management system 104 may operate on another server device or on a client device.

The management system 104 may monitor services 134 that may be provided on a gateway device 132. The gateway device 132 may be a server, network appliance, firewall, or other device that connects between a local area network 122 and a wide area network 136 that may include the Internet. In many cases, a gateway device 132 may provide many different security related services for a network.

Remote services 138, which may include web services 140, may be monitored and managed by the management system 104. Remote services 138 and web services 140 may be services that are accessed over a wide area network 136. Typically, a remote service 138 or web service 140 may be hosted by a third party at a remote location. In some cases, such services may be available on a subscription basis. A web service may be a special case of a remote service, where protocols such as SOAP, WSDL, or other standardized systems are implemented.

In some cases, a health analysis engine 142 and corrective action generator 144 may be provided as a remote service. In such a case, the management system 104 may use a script 108 to query the various services and gather status information. The status information may be transmitted to the remote health analysis engine 142 to return summary statistics, and similarly the status information may be transmitted to a remote corrective action generator 144 to return corrective actions to be displayed on the user interface 110.

Figure 2:
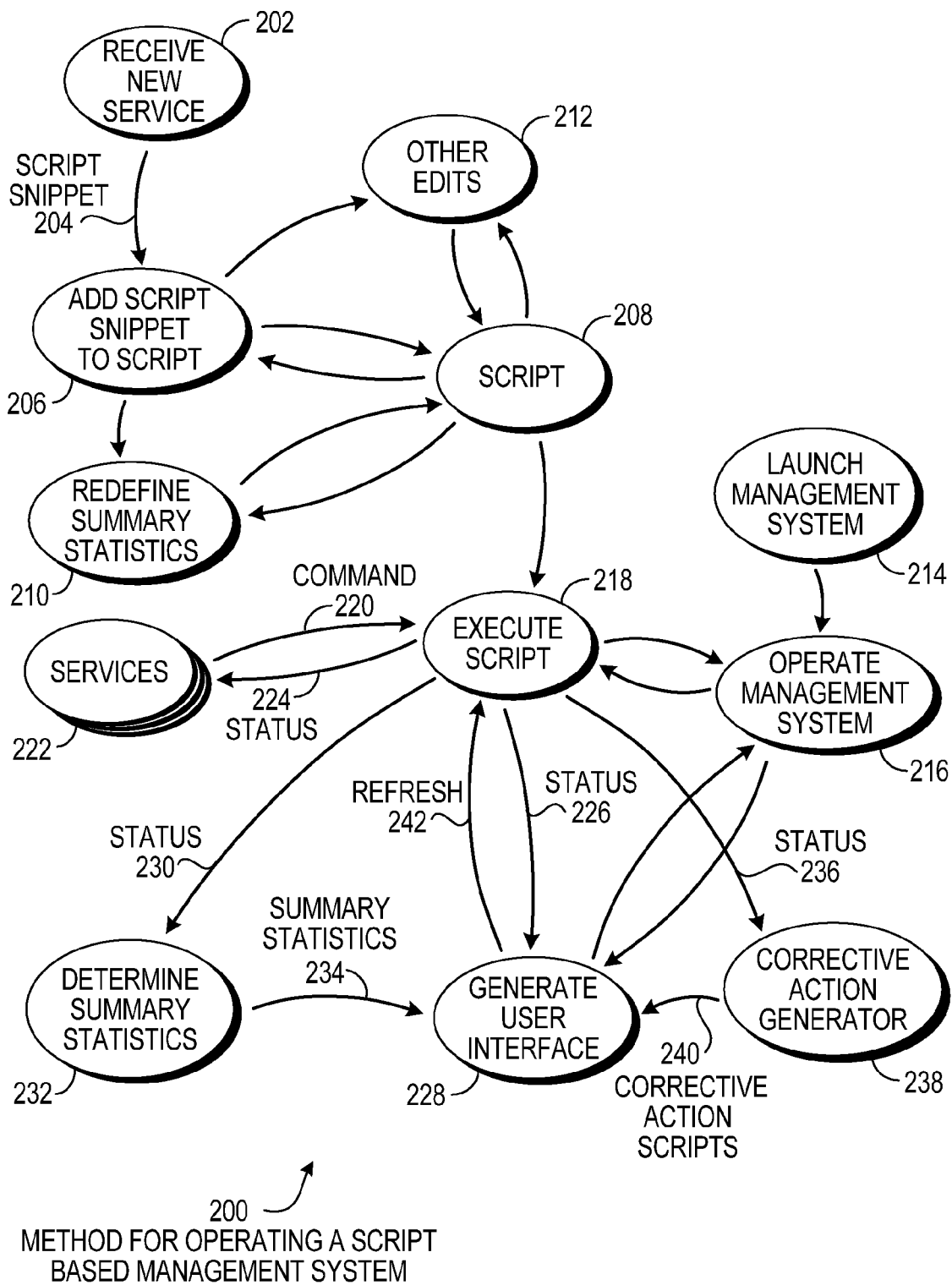
FIG. 2 is a flowchart illustration of an embodiment showing a method for operating a script based management system.

FIG. 2 is a diagram illustration of an embodiment 200 showing a method for operating a script based management system. Embodiment 200 is a simplified example of the actions taken and flow of data inside and outside a management system similar to the management system 104 described in FIG. 1.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates an example of the steps that may be performed by a management system. A script may be used by the management system to query various services, from which summary statistics and corrective actions may be generated. The results may be displayed on a user interface.

The script may be a human readable script that may be updated and modified by a user, who may be a system or network administrator. By changing the script, new services may be added to the management system, existing services modified, and old services removed. The script may the mechanism by which a service may be accessed and data collected for the management system. In some embodiments, a user may update the script and have a management system refresh by re-running the script, thereby having a change implemented on the fly.

A new service may be received in block 202. The service may have a script snippet 204 that may be added to the script in block 206. The script snippet may be provided with the service by the service manufacturer, or may be written by a user to access the service. When the script snippet is added in block 206, the existing script 208 may be read, modified, and saved as script 208.

In many cases, summary statistics definition may be updated or redefined in block 210. Some embodiments may include heuristics, algorithms, statements, or other definitions of summary statistics within the script 208. In such a case, a user may add a new service to the script using a snippet that retrieves data from the service, and the user may also update the summary statistics definitions to include the new service in the statistics.

A user may perform other edits in block 212 to the script 208. Other edits may include modifying the query to a service, removing a service, changing parameters sent or received from the service, or other changes.

In many embodiments, the script 208 may be created and edited using a conventional text editor. Some embodiments may have more sophisticated editors that have syntax checking, spell checking, automatic formatting, help information, and other features that are tailored to the script language.

The management system may be launched in block 214 and operated in block 216. The management system may be a complex application that performs many different monitoring, configuration, and other management functions for the various services. In many cases, a management system may have wizards or other mechanisms to perform various operations. For example, a management system may have a wizard for adding a new user, which may involve creating a user account, setting authentication credentials, and creating a messaging mailbox on server computers, and configuring a client computer with settings for the user. Such a wizard may communicate with many different services to perform the tasks.

While the management system is operating in block 216, the management system may cause the script to be executed in block 218. The script may be executed at various times during the operation of the management system. In a typical use, a user may select a page to view on a management console. When the page is selected, the script may be executed in block 218 in order to generate the data that may be displayed on the page. In some embodiments, the page may be refreshed periodically to display updated information.

When the script is executed in block 218, a command 220 may be transmitted to a service 222 and a status 224 may be received. In many cases, a script may have several such commands, each of which may be tailored to a different service 222.

In some cases, two or more commands 220 may be transmitted to one service. Some such embodiments may have a sequence of commands 220 that are transmitted to a service 222. In some cases, a sequence of commands 220 and status 224 may be exchanged between a management system and a service 222.

The status 224 returned from the service 222 may be any type of data, including status information, performance data, summary statistics for the service, configuration information, and other data concerning the operation of the service. In some cases, the status 224 may include query results from a service, such as searching a user database service for an email address, and the status 224 may include the requested email address.

The status 224 may be received by the management system and transmitted as status 226 to block 228 where a user interface may be generated. In some embodiments, the status 224 received from the services 222 may be modified, manipulated, analyzed, or otherwise processed before being transmitted as status 226. In some such embodiments, such analysis or processing may be performed as defined in the script 208.

In many embodiments, the script 208 may define groupings and subgroupings of services. In some cases, a group of services may be defined so that summary statistics may be generated for the group. In many cases, a user interface may organize data based on a group or subgroup of services that is defined in the script 208.

In some embodiments, different scripts may be used for different groups of services. For example, a script may be defined for a group of security services while another script may be defined for a group of messaging related services. The script for security services may have the services further grouped into local services and client services, for example.

The status 224 may be received by the management system and transmitted as status 230 to determine summary statistics in block 232. In some cases, the functions of block 232 may be performed by portions of the script 208 in block 218. In other cases, the summary statistics may be determined by a locally running function, such as the health analysis engine 114 of embodiment 100, or by a remotely running service such as the health analysis engine 142 of embodiment 100.

The status 224 may be received by the management system and transmitted as status 236 to block 238 where corrective actions may be generated. One or more corrective action scripts 240 may be transmitted to block 228 for incorporation into the user interface. In some embodiments, the status 224 received from the services 222 may be modified, manipulated, analyzed, or otherwise processed before being transmitted as status 236. In some such embodiments, such analysis or processing may be performed as defined in the script 208.

FIG. 3 is a diagram illustration of an embodiment 300 of a user interface which may be generated by a management system as described in embodiments 100 and 200. Embodiment 300 is a simplified example of a user interface that includes data gathered using a script, along with summary status information and corrective action links that may be determined from the script-generated data. In many embodiments, some or all of the summary status information and corrective action links may be defined in the script as well.

Embodiment 300 is an example of a graphical user interface that may be generated by a management system. Each embodiment of a management system may have different user layouts and organizations of information. In the example of embodiment 300, the user interface 302 may have a title 304 and high level tabs 306, 308, and 310. Tab 306 may be for "user services", tab 308 for "messaging services", and tab 310 for "security services".

Each tab may reflect one grouping of services. In some embodiments, a separate script may be defined for each group of services. In other embodiments, a single script may have the various groups defined therein. In many embodiments, various levels of subgroups of services may be defined. In many embodiments, the groups and subgroups of services may be reflected in the user interface, as with the tabs 306, 308, and 310. In other embodiments, some groups defined in a script may be used for calculating summary statistics or for other functions and may or may not be reflected in the user interface.

The tabs 306, 308, and 310 may have user input mechanisms or links that cause one of the three respective pages to be displayed. In the embodiment 300, the security services tab 310 indicates the current page contains security related services.

Each tab 306, 308, and 310 may have a summary indicator 312, 314, and 316, respectively. The summary indicators 312 and 314 reflect a good status, while the summary indicator 316 may indicate a problem status.

In many embodiments, a page on a management console may show various statistics from the services. For example, a messaging service may display an operational status plus a count of messages processed. In another example, a performance monitoring service may display the top three processes currently running on the system.

A group of local services 318 are displayed on the user interface 302. Each service 320 and 322 may represent a firewall service and virus protection service, respectively, that operate on the local device. The local device being the same device on which the management system operates.

A group of client services 324 are also displayed on the user interface 302. The client services 324 may be services that operate on client devices. For example, summary 332 represents the status of computer named "Admin Desktop" that has an overall status 328 of "good" and an indicator 330 that reflects the "good" status. The summary 332 has an expand button 326 that a user may activate to see more details regarding the services on the "Admin Desktop" device.

Similarly, summary 340 represents the status of computer named "Sales Desktop" that has an overall status of "good" and an indicator that reflects the "good" status. The summary 340 has an expand button 334 that a user may activate to see more details regarding the services on the "Sales Desktop" device.

A summary 342 represents the status of computer named "Manager Laptop" with an overall status 336 of "bad" along with an indicator 338 that reflects the "bad" status. The summary 342 may have a detail status 344 that includes entries for services 346 and 350. Service 346 has a status of "turned off", which is a problem. Service 350 has a status of "good/running", which is not a problem. A contract button 352 may be used to toggle the appearance of the detail status 344.

The detail status 344 may include a corrective action button 348. The corrective action button 348 may be a user interface mechanism that may launch a corrective action. In this case, button 348 may cause a firewall service to start operating.

Embodiment 300 illustrates grouping of services. Some services are grouped on a high level using the tabs 306, 308, and 310. Within the tab groupings, the security services are grouped into local services and client services. Within the client services, each client device may have several services.

In many embodiments, the hierarchical groups of services may be defined in a script. In order to rearrange the grouping of the user interface, a user may edit the script.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A management system comprising:
   a human readable script comprising an executable statement for each of a plurality of services, said executable statement configured to determine a health state for said service;
   a first processor on a first device configured to execute a script engine, said script engine configured to execute said human readable script and return said health state for each of said services;
   said first processor configured to further identify a first problem health state from said health state and create a corrective action for said first problem health state; and
   a user interface configured to display said health state for each of said services and a link to said corrective action for said first problem health state.

2. The management system of claim 1, said script engine having a command line interface.

3. The management system of claim 1, at least one of said services being operated on said first device.

4. The management system of claim 1, at least one of said services being operated on a second device.

5. The management system of claim 4, said second device being connected to said first device over a local area network.

6. The management system of claim 4, said second device being connected to said first device over a wide area network.

7. The management system of claim 4, at least one of said services being operated on a plurality of devices, and said health state being an aggregation of a health state for each of said plurality of devices.

8. The management system of claim 1, said executable statement comprising a query to a plurality of devices performing said service.

9. The management system of claim 1 further comprising:
a health analysis engine configured to determine an aggregated health based on said health state for each of said plurality of services.

10. The management system of claim 9, said health analysis engine being operated on a second device.

11. The management system of claim 10, said second device being accessed over a wide area network.

12. The management system of claim 9, said aggregated health being defined in an aggregation script.

13. The management system of claim 12, said aggregation script being comprised in said human readable script.

14. The management system of claim 1, said user interface being displayed on a second device.

15. A method comprising:
executing a management system on a first device having a first processor;
within said management system, executing a first human readable script comprising a plurality of sections, each of said sections having at least one executable statement configured to determine a security state for one of a plurality of security functions;
for each of said security functions, displaying said security state within a user interface, said security functions being organized by said plurality of sections;
determining an overall security status based on said plurality of security states; and
displaying said overall security status in said user interface.

16. The method of claim 15 further comprising:
for one of said security functions, providing a user input device within said user interface, said user input device configured to execute a second human readable script configured to change at least one parameter with said one of said security functions.

17. The method of claim 15 further comprising:
generating a report comprising said security state for each of said security functions.

18. The method of claim 15 further comprising:
defining a security status subgroup within said first human readable script, said security status subgroup being defined by a subgroup of said security states; and
displaying said security status subgroup.

19. A system comprising:
a human readable script comprising an executable statement for each of a plurality of security services, said executable statement configured to determine a health state for said security service, a first security service operating on a remote device, at least one of said executable statements configured to start one of said security services on said remote device;
a first processor on a first device configured to execute a script engine, said script engine configured to execute said human readable script and return said health state for each of said services; and
a user interface configured to display said health state for each of said security functions, said user interface being capable of being viewed on a second device.

20. The system of claim 19, said human readable script comprising a summary statistic defined using at least two of said health states, said user interface being further configured to display said summary statistic.

* * * * *